UNITED STATES PATENT OFFICE.

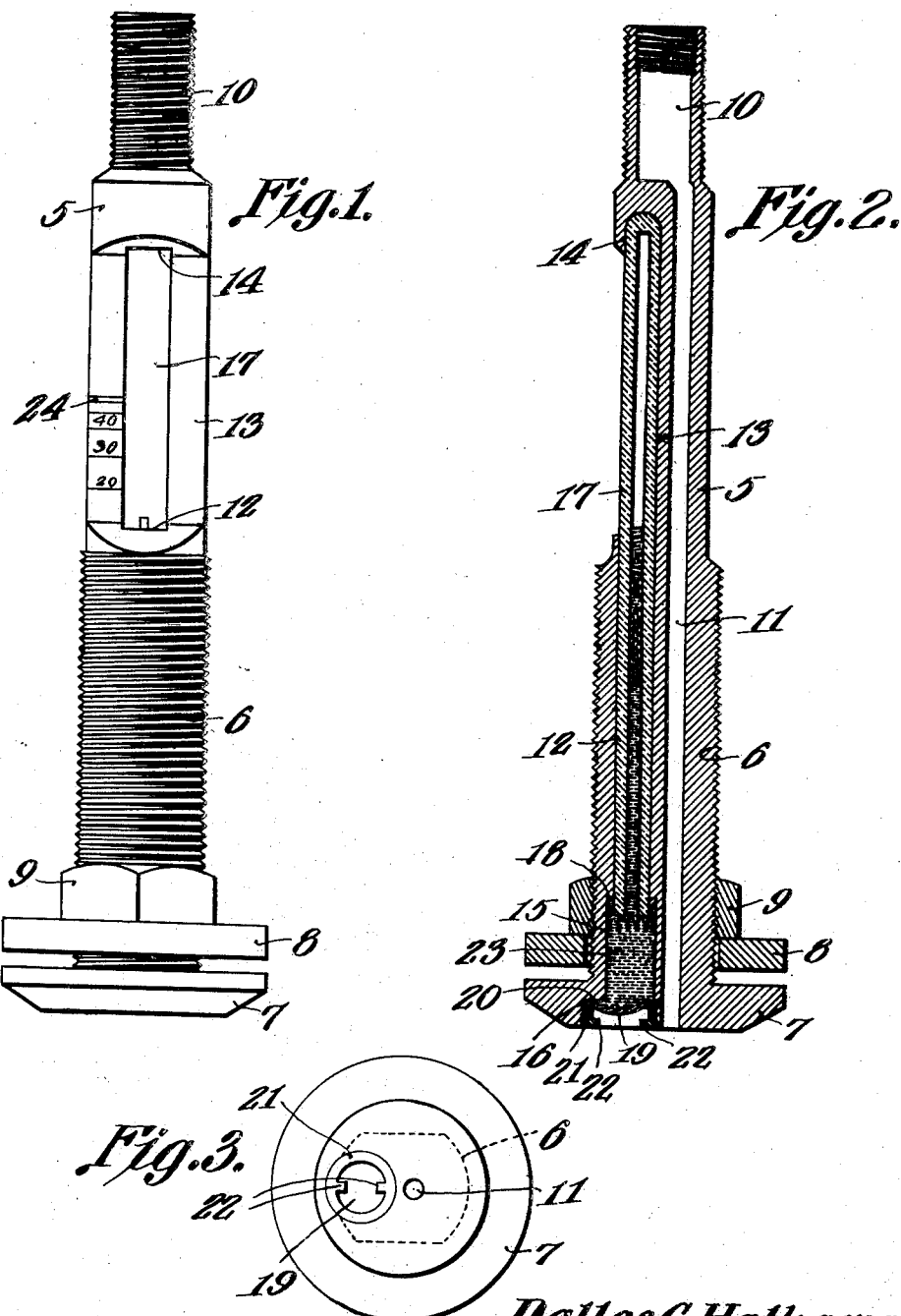

DALLAS C. HATHAWAY, OF SHELDON, ILLINOIS.

COMBINATION TIRE VALVE-STEM AND PRESSURE-GAGE.

1,079,704.

Specification of Letters Patent.

Patented Nov. 25, 1913.

Application filed June 19, 1912. Serial No. 704,649.

*To all whom it may concern:*

Be it known that I, DALLAS C. HATHAWAY, a citizen of the United States, residing at Sheldon, in the county of Iroquois and State of Illinois, have invented a new and useful Combination Tire Valve-Stem and Pressure-Gage, of which the following is a specification.

The present invention is a combination tire valve stem and pressure gage, and contemplates the production of a tire valve stem which has a pressure gage combined therewith within its compass, so that the valve stem may be employed in its ordinary capacity and in order that the pressure of the air within the tire will be indicated by the gage which is exposed for observance.

Among its other objects, this invention aims to provide a device of the character indicated, which shall be simple, compact and inexpensive in construction; which shall be convenient, serviceable and efficient in use and which shall not encumber the valve stem; and which may be employed similarly to present valve stems or barrels.

With the foregoing general objects outlined, and other objects in view, which shall be apparent as the invention is better understood, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The preferred embodiment of the invention has been illustrated in the accompanying drawings, wherein:—

Figure 1 is a side elevation of the valve stem as constructed in accordance with the present invention. Fig. 2 is a longitudinal central section thereof. Fig. 3 is a bottom view.

Referring specifically to the drawings, the valve stem is of the general formation as employed in the present day for attachment to the inner tubes of automobile, bicycle or other pneumatic tires, the stem or barrel having the externally threaded portion 6 which is adapted to pass inwardly through the rim or felly of the wheel and which is flattened at opposite sides, as usual, and a reduced circular portion 5 beyond the portion 6. The valve stem or barrel has the tip 10 at the outer end of the portion 5, which is externally and internally screw-threaded. A check valve of any standard or suitable construction may be engaged in the tip 10, and a suitable cap may be engaged over the said tip so as to close the valve when the tire or inner tubing is not being inflated, said tip 10 being designed for the attachment of the pump connection when the cap is removed, for purpose of inflating the tire or inner tubing. At its outer end, the portion 6 of the valve stem is provided with the usual external flange 7, and a washer 8 coöperates with the said flange to clamp the tubing therebetween in order to attach the valve stem to the tubing, a nut 9 being engaged on the portion 6 in order to clamp the tubing between the flange 7 and the washer 8, as will be apparent.

The foregoing parts are of the usual or standard construction, and in carrying out the present invention, the stem or valve is provided with an eccentric longitudinal air bore 11 extending throughout its length, or from the outer end of the portion 6 to the tip 10, the valve stem being provided with a secondary or gage tube bore 12 in an eccentric relation therewith and parallel with the bore 11, but terminating short of the tip 10. The bore 12 is provided with a primary and an eccentric secondary counter-bore 15 and 16, respectively, at its lower end, and the side of the portion 5 adjoining the bore 12 is cut away as designated by the numeral 13 flush with the inner wall of the said bore, thereby providing a socket 14 at the upper end of the stem, which is in fact the upper end or continuation of the bore 12.

A mercury tube 17 is inserted in the bore 12 and passes through the cut away portion 13 so that its upper end engages and seats in the socket 14, the upper and lower ends of the said tube being closed and opened, respectively. The lower end of the tube 17 enters the primary counter-bore 15, and a packing ring 18 is disposed between the lower end of the said tube and the walls of the primary counter-bore 15. The mercury tube 17 is retained in position by means of cement or other adhesive material, or in any other suitable manner. The cut away portion 13 exposes the mercury tube 17 sufficiently along its length for observing the rise and fall of the mercury therein, as hereinafter set forth.

A flexible diaphragm 19 of any suitable material is seated within the secondary and eccentric counter-bore 16, the said diaphragm having its edges thickened as designated by the numeral 20, so that the edges in seating against the shoulder formed by the secondary counter-bore will space the diaphragm 19 sufficiently downward below the said shoulder or the lower end of the primary counter bore 15 so that the mercury may pass below the shoulder. This diaphragm 19 is retained in position by means of a binding ring 21 screw-threaded into the secondary counter-bore 16 and contacting with the edges of the diaphragm, the binding ring 21 being provided with internal lugs 22 for convenience in rotating the same by means of a suitable implement. The primary counter-bore 15 provides a mercury chamber wherein the mercury 23 is contained, the mercury extending up into the tube 17 to a position at the lower end of the cut away portion 13, when no pressure is applied to the diaphragm 19, or under normal conditions. The upper end of the tube 17 being closed provides an air space between the level of the mercury and the upper end of the tube, so that when the diaphragm 19 is pressed upwardly by the pressure of air within the tire, the mercury column 23 within the tube 17 will be raised against the air in the upper end of the tube 17 so as to compress the air in the upper end of the tube. In order to determine the pressure of the air within the tubing or tire, a series of graduations 24 have been provided along one side of the cut away portion 13, the level or upper end of the column of mercury 23 in the tube 17 indicating the pressure in pounds of the air within the tire on the graduations 24.

From the foregoing, taken in connection with the drawings, it will appear that the valve stem may be applied to the tire in the usual fashion and may be inserted inwardly through the rim or felly of the wheel and secured thereto, as usual. It is also apparent that any suitable valve may be provided for the valve stem, and that a cap may be engaged over the tip 10 or over the valve stem as a whole, as may be found to be beneficial or necessary. Then, as the inner tubing or tire is inflated, air pressure impinging on the diaphragm 19 will press the diaphragm upwardly in order to raise the column of mercury within the tube 17, so as to indicate the pressure of air on the series of graduations 24. In this manner, the air pressure will be at all times indicated in order to permit the operator to observe the pressure of the air, either when inflating the tire or after the tire has been inflated, it being desirable to take the readings at a certain or predetermined position of the wheel.

It is to be observed that the edges of the diaphragm being thickened and seating against the shoulder formed by the secondary counter bore will space the diaphragm below the said shoulder in order that the mercury may pass below the shoulder. Thus, a greater area of mercury is exposed to the pressure of the air within the tire, and as the result, the readings will be more precise.

It will be apparent that the objects aimed at are attained in a satisfactory and effective manner, and that the present valve stem or valve is a desirable one for the purposes to which it is designed, it being understood that the design, sizes, proportions, and materials of the various parts may be altered according to the dictates of convenience or efficiency.

Having thus described the invention what is claimed is:—

1. A tire valve barrel having eccentric and parallel air and gage tube bores, the lower end of the latter bore having a primary and an eccentric secondary counter-bore and the upper end of the latter bore terminating short of the tip of the barrel, a mercury tube fitting in the said bore and having its outer end closed and seated against the upper end of the bore, the lower end of the tube being open and entering the primary counter-bore, a packing ring in the counter-bore around the end of the tube, a diaphragm having its edges thickened and seated against the shoulder formed by the secondary counter-bore so as to space the diaphragm from the said shoulder, and a binding ring screw-threaded into the secondary counter-bore and bearing against the thickened edge of the diaphragm to retain the diaphragm in position, a portion of the valve being cut away to expose the tube and bearing graduations.

2. A tire valve barrel having parallel air and gage tube bores, the lower end of the latter bore having a primary and a secondary counter-bore, a mercury tube fitting in the latter bore, the lower end of the tube entering the primary counter-bore, a diaphragm having its edges thickened and seated against the shoulder formed by the secondary counter-bore, so as to space the diaphragm from the said shoulder, and a ring engaged in the secondary counter-bore and bearing against the thickened edge of the diaphragm to retain the diaphragm in position, a portion of the valve being cut away to expose the tube and bearing graduations.

In testimony that I claim the foregoing as my own, I have hereto affixed my signature in the presence of two witnesses.

DALLAS C. HATHAWAY.

Witnesses:
F. BURKLE,
J. ALBA GLASSLEY.